United States Patent
Lee

(10) Patent No.: US 6,511,401 B2
(45) Date of Patent: Jan. 28, 2003

(54) SHIFT CONTROL METHOD FOR AUTOMATIC TRANSMISSION

(75) Inventor: Sang-Chul Lee, Gunpo (KR)

(73) Assignee: Hyundai Motor Company & Kia Motors Corporation, Seoul (KR)

( * ) Notice: Subject to any disclaimer, the term of this patent is extended or adjusted under 35 U.S.C. 154(b) by 0 days.

(21) Appl. No.: 09/953,419

(22) Filed: Sep. 14, 2001

(65) Prior Publication Data
US 2002/0032099 A1 Mar. 14, 2002

(30) Foreign Application Priority Data
Sep. 14, 2000 (KR) ........................................ 2000-53927

(51) Int. Cl.$^7$ ............................................... F16H 59/36
(52) U.S. Cl. ........................ 477/131; 477/133; 477/138
(58) Field of Search ................................ 477/127, 131, 477/133, 138

(56) References Cited

U.S. PATENT DOCUMENTS

| 4,905,545 A | * | 3/1990 | Leising et al. ............... 477/133 |
| 5,092,199 A | * | 3/1992 | Goto et al. .................. 477/133 |
| 5,769,754 A | * | 6/1998 | Kil .............................. 477/133 |
| 5,820,517 A | * | 10/1998 | Saito et al. .................. 477/109 |
| 6,454,678 B1 | * | 9/2002 | Lee ............................. 477/139 |

* cited by examiner

Primary Examiner—Sherry Estremsky
(74) Attorney, Agent, or Firm—Christie, Parker & Hale, LLP

(57) ABSTRACT

A shift control method for an automatic transmission improves shift feel and acceleration characteristics by determining if 4→3 shifting is required during lift-foot-up 3→4 shift control, and if so, the method controls a number of solenoid valves and friction elements with input from a plurality of sensors that stop the lift-foot-up 3→4 shift when the accelerator pedal is again depressed after being released.

10 Claims, 4 Drawing Sheets

SHIFT CONTROL METHOD FOR AUTOMATIC TRANSMISSION

CROSS-REFERENCE TO RELATED APPLICATION

This application claims priority of Korean Patent application number 2000-53927, filed Sep. 14, 2000.

BACKGROUND OF THE INVENTION (a) Field of the Invention

The present invention relates to a shift control method for an automatic transmission. More particularly, the present invention relates to a shift control method for an automatic transmission in which if an accelerator pedal is depressed by the driver during a lift-foot-up 3→4 shift operation of a drive D range, shifting is immediately performed into a third speed rather than first into a fourth speed, thereby improving shift feel and acceleration characteristics.

(b) Description of the Related Art

In automatic transmissions used for vehicles, a shift control system performs control to realize automatic shifting into different speeds and shift ranges according to various factors including throttle opening, vehicle speed and load, and several engine and driving conditions detected through a plurality of sensors. That is, based on such factors, the shift control system controls a plurality of solenoid valves of a hydraulic control system such that hydraulic flow in the hydraulic control system is controlled, resulting in the shifting of the transmission into the various speeds and shift ranges.

In more detail, when the driver manipulates a shift lever to a particular shift range, a manual valve of the hydraulic control system undergoes port conversion as a result of the manual valve being indexed with the shift lever. By this operation, hydraulic pressure supplied from a hydraulic pump selectively engages a plurality of friction elements of a gearshift mechanism according to the duty control of the solenoid valves, thereby realizing shifting into the desired shift range.

In such an automatic transmission, shift quality is determined by how smoothly the friction elements are engaged and disengaged. Namely, when changing shift ranges, the timing between the engagement of a specific set of friction elements in relation to the disengagement of another specific set of friction elements determines the shift quality of the automatic transmission. Accordingly, there have been ongoing efforts to develop improved shift control methods that enhance shift quality by better controlling the timing of friction elements to engaged and disengaged states.

While driving in a drive D range of the automatic transmission described above, shifting is performed into at least one higher speed (when not already driving in the highest speed) when the driver releases the accelerator pedal. This is done to minimize shift shock. For example, if the accelerator pedal is released when driving in a third speed of the drive D range, shifting into a fourth speed is performed. If the accelerator pedal is again depressed, shifting is performed back into the third speed.

Before the completion of lift-foot-up 3→4 shifting, however, if the accelerator pedal is again depressed by the driver, tip-in 4→3 downshift control is realized. At this time, shifting is first completed into the fourth speed, after which shifting back into the third speed is performed. Such back-to-back shifting significantly reduces shift feel. That is, since the vehicle is first slowed by the shifting into the fourth speed then abruptly shifted back into the third speed, the vehicle tends to lurch forward. Also, shift responsiveness is negatively affected since shifting is not immediately performed into the third speed, thereby resulting in poor acceleration characteristics of the vehicle.

SUMMARY OF THE INVENTION

The present invention has been made in an effort to solve the above problems.

It is an object of the present invention to provide a shift control method for an automatic transmission in which if an accelerator pedal is depressed by the driver during a lift-foot-up 3→4 shift operation of a drive D range, shifting is immediately performed into a third speed rather than first into a fourth speed, thereby improving shift feel and acceleration characteristics.

To achieve the above object, the present invention provides a shift control method for an automatic transmission comprising the steps of (a) determining a duty ratio of a first solenoid valve that controls friction elements that are engaged in a third speed and disengaged in a fourth speed, if it is determined in a transmission control unit that tip-in 4→3 shifting is required as a result of the driver depressing the accelerator pedal during lift-foot-up 3→4 shift control; (b) determining if a value resulting from subtracting turbine rpm of a present fourth speed shift state from turbine rpm of a third speed is greater than a first reference value if the duty ratio of the first solenoid valve is not a reference duty ratio; (c) controlling, if the condition of step (b) is satisfied, the first solenoid valve to an initial state using an initial reference duty ratio, controlling the first solenoid valve according to a predetermined duty, then determining if a time required for the duty control is greater than a first reference time; (d) determining if a present turbine rpm is greater than a sum of engine rpm and a second reference value 11 if the time required for the duty control in step (c) is greater than the first reference time; (e) outputting an initial duty of feedback control by the first solenoid valve then performing feedback control if the present turbine rpm is greater than a sum of engine rpm and the second reference value; (f) determining if an absolute value of turbine rpm minus engine rpm is less than a third reference value; (g) controlling, if the condition of step (f) is satisfied, the first solenoid valve to a predetermined duty, and determining if a second reference time has elapsed during the control of the first solenoid valve; and (h) controlling, if the condition of step (g) is satisfied, a second solenoid valve to a predetermined duty to control a friction element controlled by the second solenoid valve, thereby completing shifting.

According to a feature of the present invention, the third speed is maintained if the duty ratio is determined in step (a) to be at a predetermined level.

According to another feature of the present invention, if the condition of step (b) is not satisfied, 4→3 shifting is performed after completion of shifting into the fourth speed.

According to yet another feature of the present invention, comprehensive control for engine optimization is performed simultaneously with step (c).

According to still yet another feature of the present invention, the comprehensive control is performed if it is determined that engine rpm minus turbine rpm is less than a predetermined value.

According to still yet another feature of the present invention, comprehensive control is completed simultaneously with the control of step (f).

According to still yet another feature of the present invention, it is determined in step (a) if the duty ratio of the first solenoid valve is 0%.

According to still yet another feature of the present invention, the reference duty ratio of step (b) is 0%.

According to still yet another feature of the present invention, the predetermined duty of step (g) is 0%.

According to still yet another feature of the present invention, the predetermined duty of step (h) is 0%.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
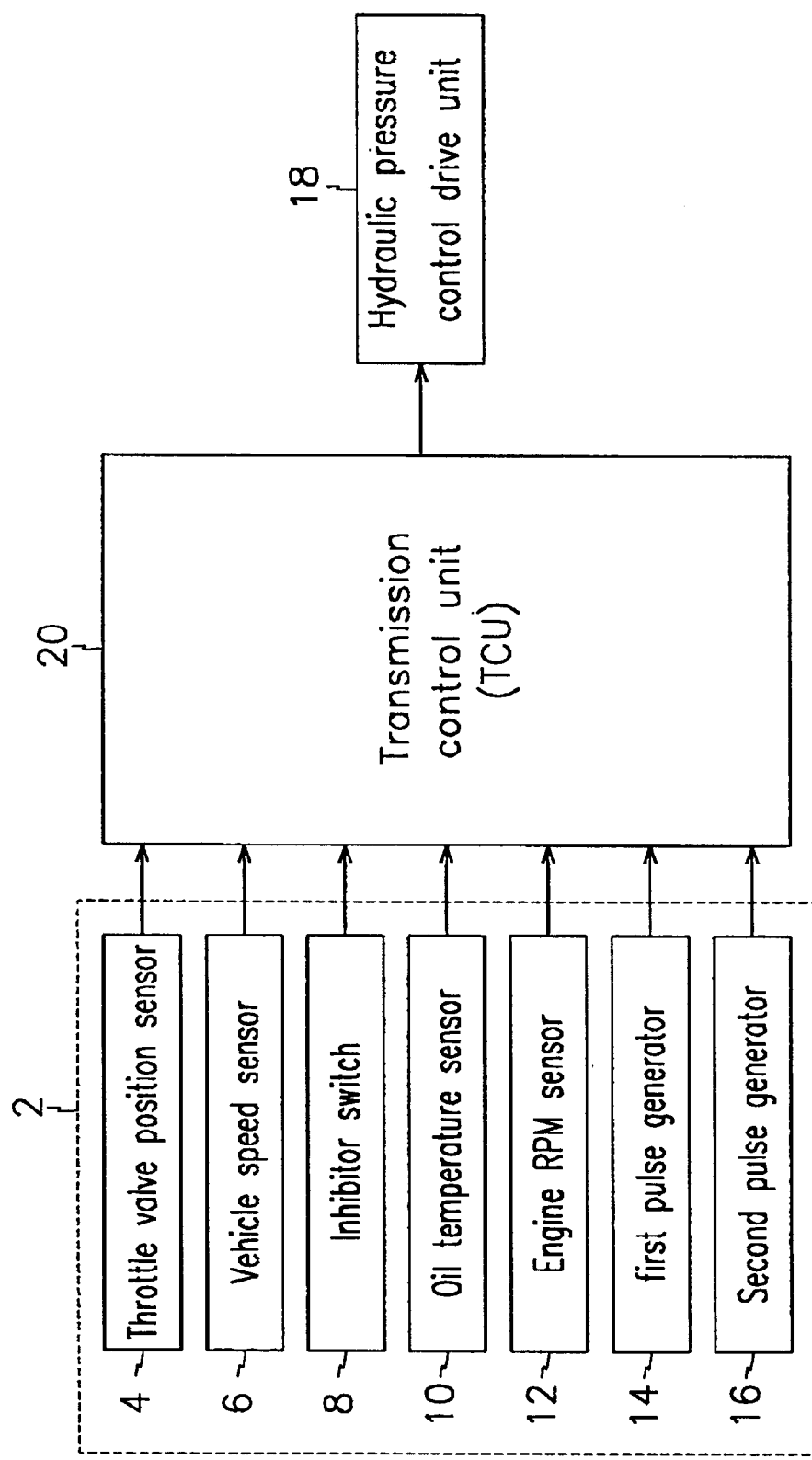
FIG. 1 is a block diagram of a shift control- system to which the present invention is applied.

FIG. 1 shows a block diagram of a shift control system to which the present invention is applied.

The shift control system comprises a vehicle state detection unit 2, a transmission control unit (TCU) 20, and a hydraulic pressure control drive unit 18. The vehicle state detection unit 2 includes a throttle valve position sensor 4, a vehicle speed sensor 6, an inhibitor switch 8, an oil temperature sensor 10, an engine RPM sensor 12, a first pulse generator 14, and a second pulse generator 16. The elements 4, 6, 8, 10, 12, 14 and 16 of the vehicle state detection unit 2 perform various detections of the state of the vehicle (i.e., the engine), and then output corresponding signals to the TCU 20. The TCU 20 compares the received signals with data stored internally, then after analysis controls the hydraulic pressure control drive unit 18 such that solenoid valves comprising the hydraulic pressure control drive unit 18 are controlled, thereby realizing shifting.

The throttle valve position sensor 4 of the vehicle state detection unit 2 detects the degree of opening of a throttle valve, the inhibitor switch 8 detects a position of a shift select lever, and the first and second pulse generators 14 and 16 detect rpm of a kickdown servo and output rpm, respectively. The vehicle speed sensor 6 detects vehicle speed, the oil temperature sensor 10 detects oil temperature, and the engine rpm sensor 12 detects engine rpm. Additional sensors may be provided as needed.

Shift control of the present invention for a vehicle that realizes shifting by controlling the hydraulic pressure control drive unit 18 according to the signals received from the vehicle state detection unit 2 will now be described.

Figure 2:
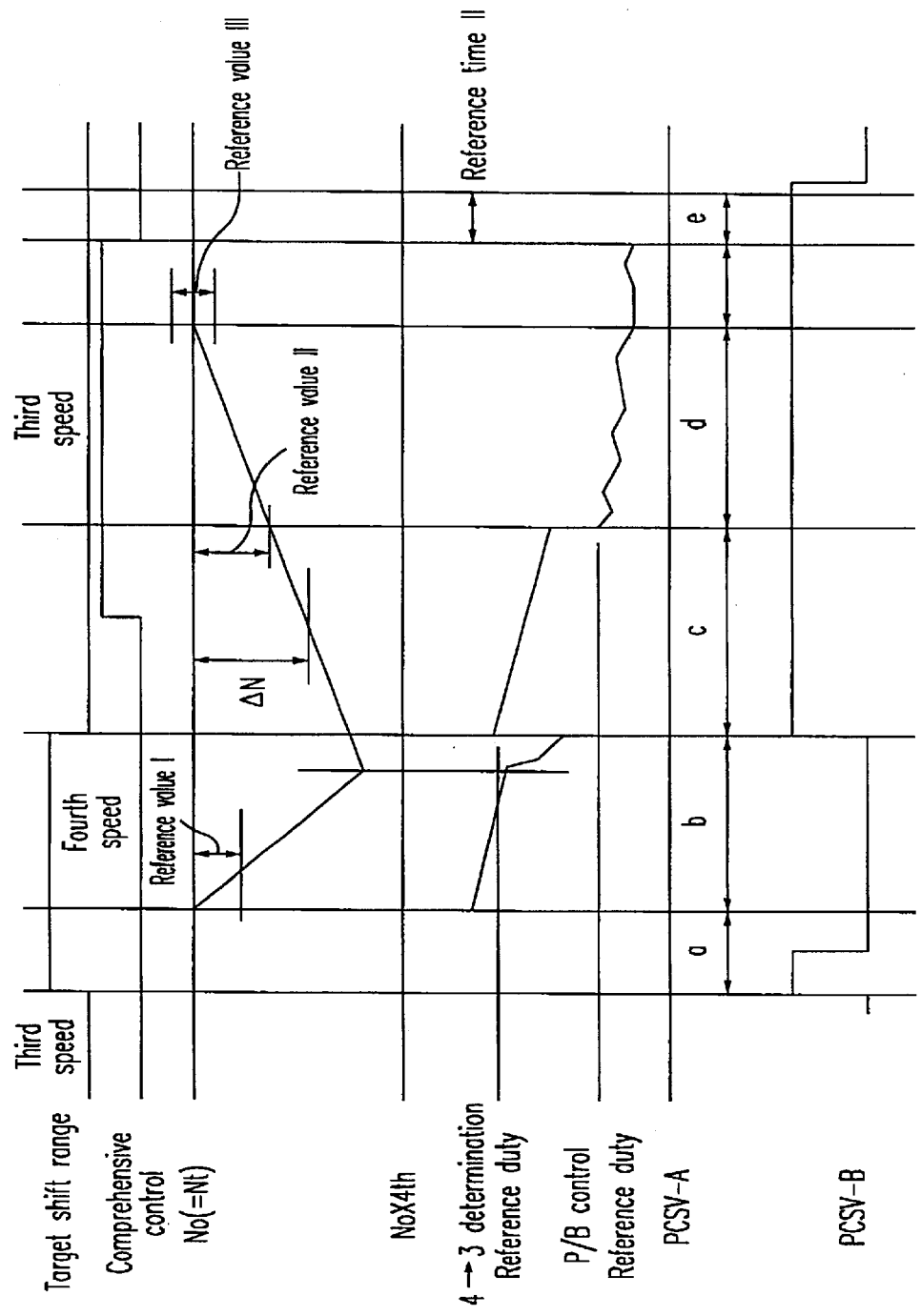
FIG. 2 is a duty pattern diagram resulting from shift control of the present invention.

FIG. 2 shows a duty pattern diagram resulting from shift control of the present invention.

In a state of driving in a third speed, if the driver releases the accelerator pedal, the TCU 20 sets a target shift range as a fourth speed then performs shift control to obtain this speed. Through such control, a duty ratio of a second solenoid valve PSCV-B abruptly increases such that friction elements controlled by the second solenoid valve PSCV-B are disengaged. Next, the duty ratio of the second solenoid valve PSCV-B is controlled back to 0% such that the friction elements are again engaged. A first solenoid valve PCSV-A, following a predetermined interval a, undergoes duty control for shifting into the fourth speed. At this time, assuming that vehicle speed is uniform, turbine rpm Nt starts to decrease by a shift gear ratio (interval b).

During the above process, if the driver again depresses the accelerator pedal to increase speed, the duty ratio at that instant abruptly decreases. This is detected by the TCU 20, which then sets the target shift range back to the third speed and commences control for this shift speed. That is, the duty of the first solenoid valve PCSV-A is increased to an initial 4-3 shift reference duty ratio, after which the duty of the first solenoid valve PCSV-A is controlled according to a pre-installed slope. The second solenoid valve PCSV-B is controlled to off such that the friction elements that are controlled by the second solenoid valve PCSV-B are disengaged.

The duty control of the first solenoid valve PCSV-A (interval c) is performed until turbine rpm Nt reaches a reference value II. If turbine rpm Nt reaches the reference value II, feedback control is realized (interval d). After performing the feedback control until turbine rpm Nt is almost identical to engine rpm, the first solenoid valve PCSV-A is controlled to a duty of 0% such that synchronization of the friction elements controlled by the first solenoid valve PCSV-A is completed.

With the completion of the synchronization of the friction elements controlled by the first solenoid valve PCSV-A, the second solenoid valve PCSV-B is controlled to off after a predetermined interval e has passed. Accordingly, shifting into the third speed from the fourth speed is completed by the operational control of the friction elements controlled by the second solenoid valve PCSV-B.

Figure 3A:
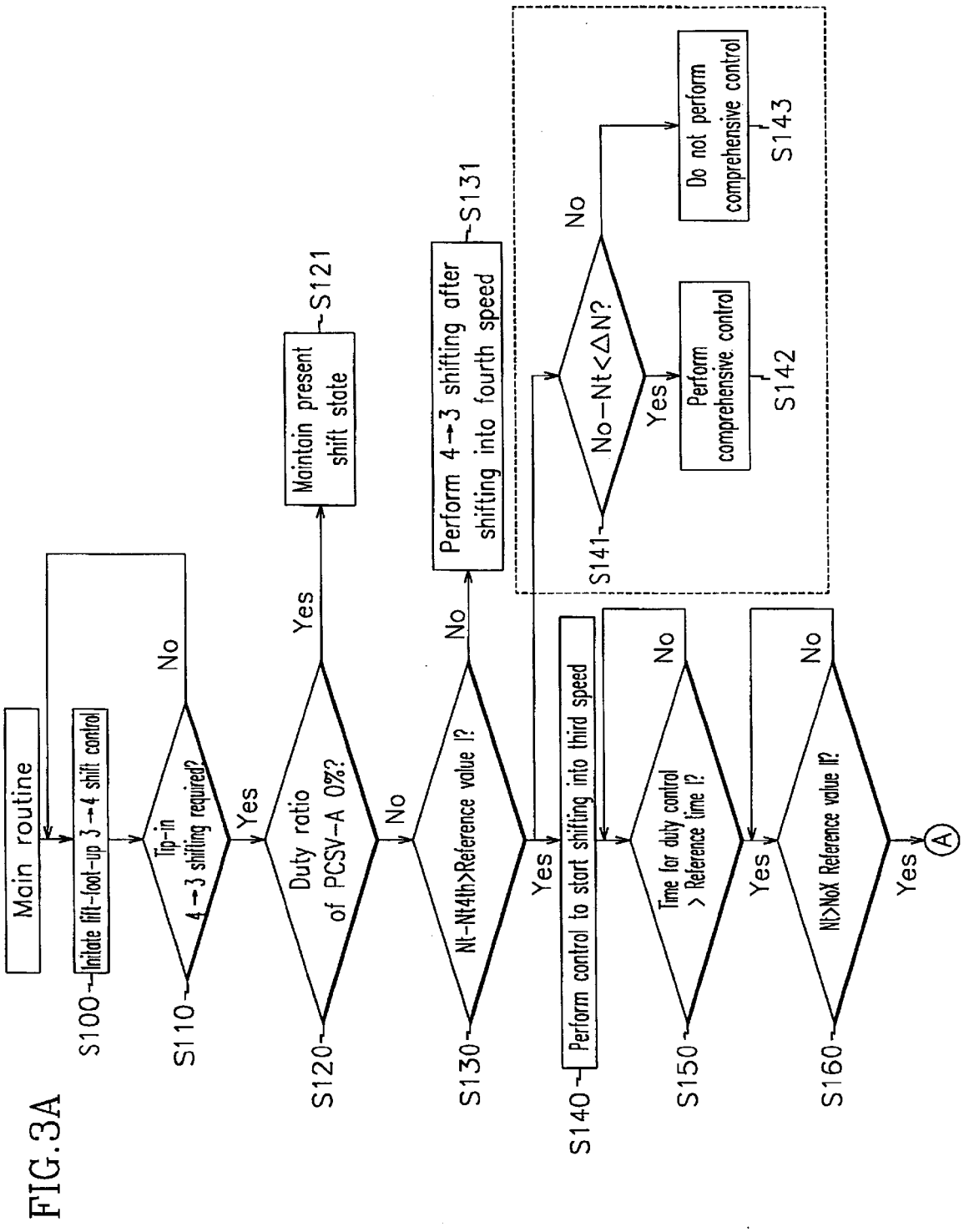
FIGS. 3a and 3b are flow charts of a shift control method according to a preferred embodiment of the present invention.
Figure 3B:
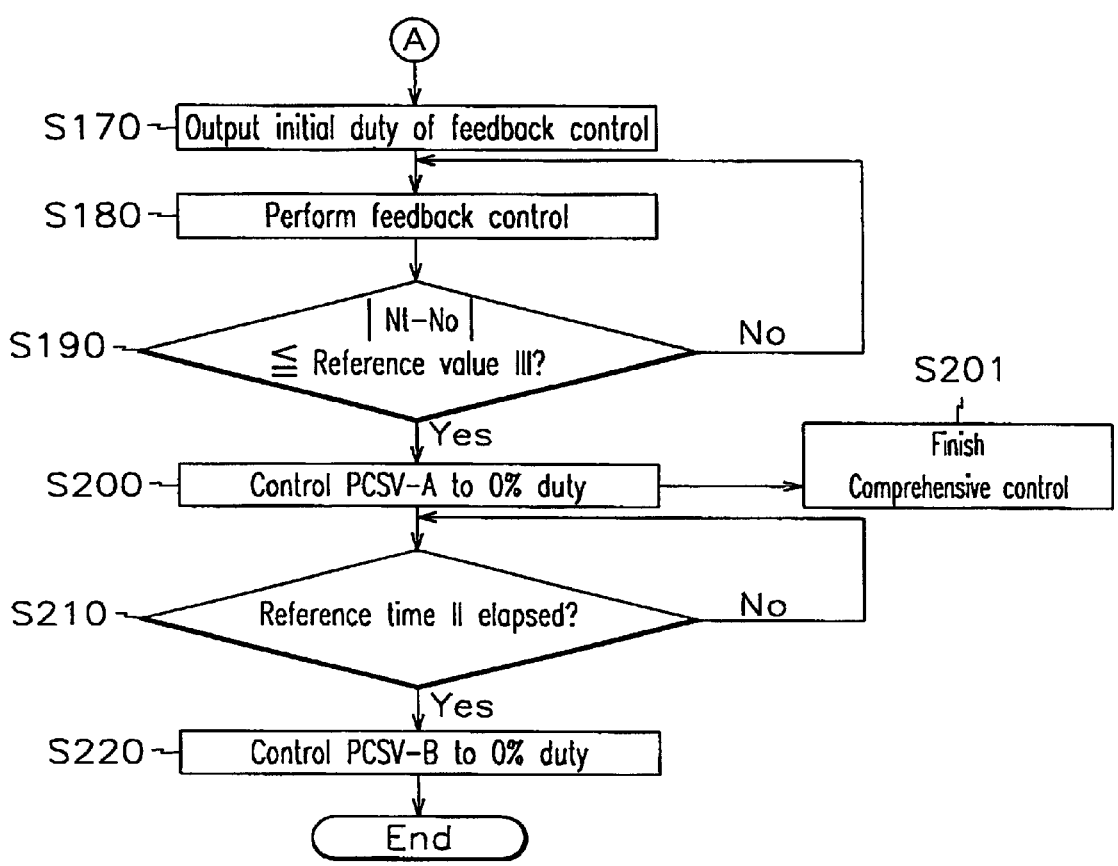

FIGS. 3a and 3b show flow charts of a shift control method according to a preferred embodiment of the present invention.

First, lift-foot-up 3→4 shift control is initiated in step S100 if it is determined that the driver has released the accelerator pedal. Next, if the driver again depresses the accelerator pedal, the TCU 20 determines if tip-in 4→3 shifting is required in step S110. If it is determined that tip-in 4→3 shifting is needed, it is then determined if the duty ratio of the first solenoid valve PCSV-A, which controls the friction elements engaged in the third speed and disengaged in the fourth speed, is at a reference duty ratio of 0% in step S120. A 0% duty ratio of the first solenoid valve PCSV-A indicates that shifting into the fourth speed has not started. Therefore, if it is determined that the duty ratio of the first solenoid valve PCSV-A is 0%, the present shift state (i.e., the third speed of the drive D range) is maintained in step S121.

However, if it is determined that the duty ratio of the first solenoid valve PCSV-A is not 0%, the processes required for 4→3 shift control are performed. That is, it is first determined if a value resulting from subtracting turbine rpm Nt4th of a present fourth speed shift state from turbine rpm Nt of a third speed is greater than a reference value I in step S130. The satisfaction of this condition, namely Nt−Nt4th>reference value I, indicates to what degree shifting into the fourth speed has been performed. If Nt−Nt4th is less than the reference value I, since this indicates that shifting into the fourth speed is at an end stage, it is preferable that shifting is completed before shifting into the third speed. Here, the reference value I is in units of rpm and is different depending on the type of vehicle. However, an approximations of the reference value I for most vehicles is 200 rpm.

Accordingly, if it is determined in step S130 that Nt−Nt4th is not greater than the reference value I, shifting into the third speed is performed after completion of shifting into the fourth speed in step S131. However, if Nt−Nt4th is greater than the reference value I, since there is still time before shifting into the fourth speed is completed, control is performed to start shifting into the third speed. Namely, the first solenoid valve PCSV-A is controlled to an initial state using an initial reference duty ratio that is input to the TCU 20 and which is applied when it is determined that 4→3 shifting is required, then the first solenoid valve PCSV-A is controlled according to a predetermined slope of a pre-installed duty ratio such that shifting is started in step S140. Here, the initial reference duty ratio used when it is determined that 4→3 shifting is required varies greatly according to vehicle. However, an approximate value is 50%.

Various steps are performed simultaneously with step S140. First, it is determined if engine rpm No minus turbine rpm Nt, is less than a predetermined value ΔN in step S141. If No−Nt<ΔN, comprehensive control is performed in step S142. However, if the resulting rpm of No−Nt is not less than ΔN, comprehensive control is not performed in step S143. Comprehensive control refers to a conventional process of improving shift performance and decreasing clutch wear. In particular, the problem of torque variations inherent to the structure of automatic transmissions and a reduction in shift performance caused by continued increases in the output and torque of engines are difficult to remedy by control of the transmission alone. As a result, ignition timing is retarded in the ECU during shifting such that engine torque is reduced, resulting in an improvement in shift performance and a decrease in clutch wear. The predetermined value ΔN varies according to engine output and is therefore not limited to a specific value.

Following step S140, it is determined if a time required for the duty control of step S140 is greater than a first reference time I in step S150. If the duty control time of step S140 is greater than the first reference time I, it is determined if present turbine rpm Nt is greater than a value resulting from multiplying engine rpm No by a reference value 11 in step S160. If present turbine rpm Nt>No X reference value II, the first solenoid valve PCSV-A outputs an initial duty of feedback control in step S170, after which feedback control is performed in step S180. Since the duty control time and first reference time I of step S160 vary according to vehicle, the values are not limited to specific levels. However, an approximate value for the first reference time is 40 ms.

If the time for duty control during step S140 is not greater than the first reference time I, step S150 is repeated (the process is returned) until this condition is met. In step S160, it is checked whether present turbine rpm Nt is greater than the value resulting from multiplying engine rpm No by the reference value II to determine a starting point of feedback control. The reference value II varies according to vehicle and so is not limited to a specific value. The reference value II is established within a third speed gear ratio and a fourth speed gear ratio. Step S160 is also repeated until the condition is satisfied.

Following step S180 of performing feedback control, it is determined if an absolute value of Nt−No is less than a reference value III in step S190. If this condition is satisfied, the first solenoid valve PCSV-A is controlled to a duty of 0% in step S200, and, at the same time, comprehensive control is performed in step S201. Step S190 is performed to determine whether turbine rpm roughly corresponds to engine rpm in the third speed, to determine whether feedback control is at a completion point. Step S200 is performed to complete feedback control. Further, the reference value III varies according to vehicle and so is not limited to a specific value. However, it is roughly ±30 rpm.

Subsequently, it is determined if a reference time II has elapsed during the duty control of step S200 in step S210. If the reference time II has elapsed, the second solenoid valve PCSV-B is controlled to a duty of 0% in step S220. As a result, a friction element controlled by the second solenoid valve PCSV-B (a rear clutch) is engaged, after which control is completed. Step S210 is repeated until the condition is satisfied. The determination of whether the reference time II has elapsed in step S210 is done to prevent interlock of a powertrain occurring when the engaged and disengaged states of the friction elements of the first and second solenoid valves PCSV-A and PCSV-B are not timed correctly.

In the shift control method for automatic transmissions of the present invention described above, if the accelerator pedal is depressed by the driver during a lift-foot-up 3→4 shift operation of the; drive D range, shifting is immediately performed into the third speed rather than first into the fourth speed, thereby improving shift feel and acceleration characteristics.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A shift control method for an automatic transmission comprising the steps of:
   (a) determining a duty ratio of a first solenoid valve that controls friction elements that are engaged in a third speed and disengaged in a fourth speed, if it is determined in a transmission control unit that tip-in 4→3 shifting is required as a result of the driver depressing the accelerator pedal during lift-foot-up 3→4 shift control;
   (b) determining if a value resulting from subtracting turbine rpm of a present fourth speed shift state from turbine rpm of a third speed is greater than a first reference value if the duty ratio of the first solenoid valve is not a reference duty ratio;
   (c) controlling, if the condition of step (b) is satisfied, the first solenoid valve to an initial state using an initial reference duty ratio, controlling the first solenoid valve according to a predetermined duty, then determining if a time required for the duty control is greater than a first reference time;
   (d) determining if a present turbine rpm is greater than a sum of engine rpm and a second reference value II if the time required for the duty control in step (c) is greater than the first reference time;
   (e) outputting an initial duty of feedback control by the first solenoid valve then performing feedback control if the present turbine rpm is greater than a sum of engine rpm and the second reference value;
   (f) determining if an absolute value of turbine rpm minus engine rpm is less than a third reference value;
   (g) controlling, if the condition of step (f) is satisfied, the first solenoid valve to a predetermined duty, and determining if a second reference time has elapsed during the control of the first solenoid valve; and
   (h) controlling, if the condition of step (g) is satisfied, a second solenoid valve to a predetermined duty to control a friction element controlled by the second solenoid valve, thereby completing shifting.

2. The method of claim 1 wherein the third speed is maintained if the duty ratio is determined in step (a) to be at a predetermined level.

3. The method of claim 1 wherein if the condition of step (b) is not satisfied, 4→3 shifting is performed after completion of shifting into the fourth speed.

4. The method of claim 1 wherein comprehensive control for engine optimization is performed simultaneously with step (c).

5. The method of claim 4 wherein the comprehensive control is performed if it is determined that engine rpm minus turbine rpm is less than a predetermined value.

6. The method of claim 1 wherein comprehensive control is completed simultaneously with the control of step (f).

7. The method of claim 1 wherein it is determined in step (a) if the duty ratio of the first solenoid valve is 0%.

8. The method of claim 1 wherein the reference duty ratio of step (b) is 0%.

9. The method of claim 1 wherein the predetermined duty of step (g) is 0%.

10. The method of claim 1 wherein the predetermined duty of step (h) is 0%.

* * * * *